United States Patent Office 2,722,217
Patented Nov. 1, 1955

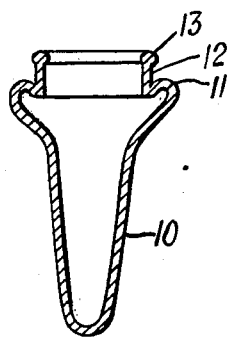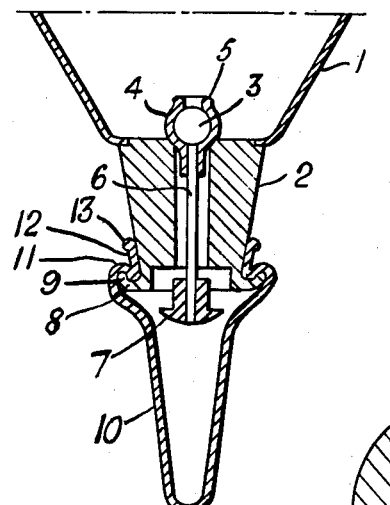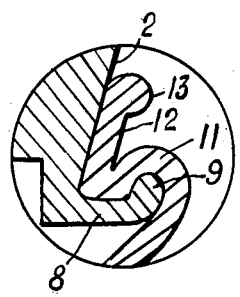

2,722,217

NIPPLE FOR FEEDING LIQUID TO YOUNG ANIMALS

George Patrick Rose-Miller, Cawdor, Nairn, Scotland

Application October 15, 1953, Serial No. 386,334

Claims priority, application Great Britain December 6, 1952

3 Claims. (Cl. 128—252)

This invention relates to a nipple for feeding liquid to young animals, of the type including a vessel serving as a container for milk or other liquid food, at least one tubular nozzle fitted to the lower part of the vessel, a teat attached to the nozzle, and a gravity-operated valve incorporated in said nozzle and having a depending stem terminating in a head adapted to be displaced upwardly by the mouth of the animal when feeding whereby to unseat the valve and control the flow of liquid through the teat.

It has been found that the teat is comparatively easily removed from the nozzle member by an animal using the feeder device, it being understood that the calf or animal being fed seeks to pull downwardly towards itself the free end of the teat and unseat the valve.

According to the present invention the teat-receiving end of the nozzle presents a flange outwardly and upwardly turned to present an annular channel, and the marginal portion of the mouth of the teat is inwardly curled, the inner portion of the curl being unitary with a cylindrical or conical extension projecting from the mouth of the teat and co-axial with the mouth of the teat, the end of the extension remote from the teat proper being beaded.

A practical embodiment of the invention is illustrated in the accompanying drawings in which Fig. 1 is a section of a teat on a diametral plane, Fig. 2 is a section through the nozzle on a diametral plane showing the teat in position, and Fig. 3 is a magnified view of the area shown ringed in Fig. 2.

In the drawings, 1 denotes the lower portion of a vessel serving as a container for milk or other liquid food, and 2 denotes a nozzle normally closing the lower end of the container 1. 3 denotes a ball-valve fitted with a sheath 4 of rubber, one end of which sheath 4 is formed with a bead 5. 6 denotes a stem depending from the ball valve 3 and fitted at its lower end with a head 7, the lower face of which is a portion of the surface of a sphere. The nozzle 2 presents at its lower end a flange 8 outwardly and upwardly turned at 9. 10 denotes a teat, the marginal portion of the mouth of which is inwardly curled at 11, the inner portion of the curl 11 adjoining a tapered extension 12 which bears on the nozzle 2 and the end of which extension 12 is beaded at 13.

In practice, when the teat 10 is applied to the nozzle 2, the inwardly curled portion 11 fits into the annular channel presented by the flange, and the upturned part or rim 9 of the flange 8 engages the annular internal recess presented by the curl 11.

If an animal feeding from the teat 10 pulls the teat 10, the tendency is for the curl 11 to straighten itself out as it is pulled over the upwardly turned portion or rim 9 of the channel. The extension 12 prevents ingress of air to the channel, and the result is that the teat 10 is held in place by atmospheric pressure. To remove the teat, the beaded end 13 of the extension 12 is pulled away from the nozzle 2, thereby admitting air to the channel, and the beaded end 13 is then rolled over the upwardly turned portion or rim 9 of the flange 8, the teat 10 being freed from the nozzle 2.

What is claimed is:

1. A teat of elastic material adapted to be secured on a nozzle on a vessel for feeding liquid to young animals, said teat comprising a body having an integral annular mouth structure for securing the teat on the nozzle, said annular mouth structure including a first portion extending upwardly and outwardly from the main body of the teat, a second portion continuing from the first portion and curled abruptly inwardly and then downwardly in spaced relation to the first portion thereby providing an annular arcuate recess opening downwardly between said portions, and a third portion inwardly of said recess continuing from the second portion and extending abruptly upwardly therefrom in the form of an annular band.

2. A teat as claimed in claim 1, in which the juncture of the second and third portions of the annular mouth structure presents a substantially horizontal surface extending inwardly from the inner edge of the recess.

3. A teat as claimed in claim 1, in which the juncture of the second and third portions of the annular mouth structure has a horizontal thickness inwardly of the recess approximately twice that of the main body of the teat and adapted to be received in a horizontal exterior annular channel of the nozzle while the upturned rim of a flange of the nozzle forming the horizontal channel is adapted to extend into the internal recess of the mouth structure of the teat.

References Cited in the file of this patent

UNITED STATES PATENTS

| | | |
|---|---|---|
| 1,466,311 | Mobley | Aug. 28, 1923 |
| 1,589,138 | Fisk | June 15, 1926 |
| 1,630,982 | Stone | May 31, 1927 |
| 1,714,757 | Beck | May 28, 1929 |
| 2,238,827 | Schmid | Apr. 15, 1941 |
| 2,280,410 | Keltner | Apr. 21, 1942 |
| 2,502,362 | Babson et al. | Mar. 28, 1950 |
| 2,579,339 | Rose-Miller | Dec. 18, 1951 |